Feb. 23, 1937.  L. A. LEPPKE  2,071,847
BOTTLE
Filed April 10, 1936
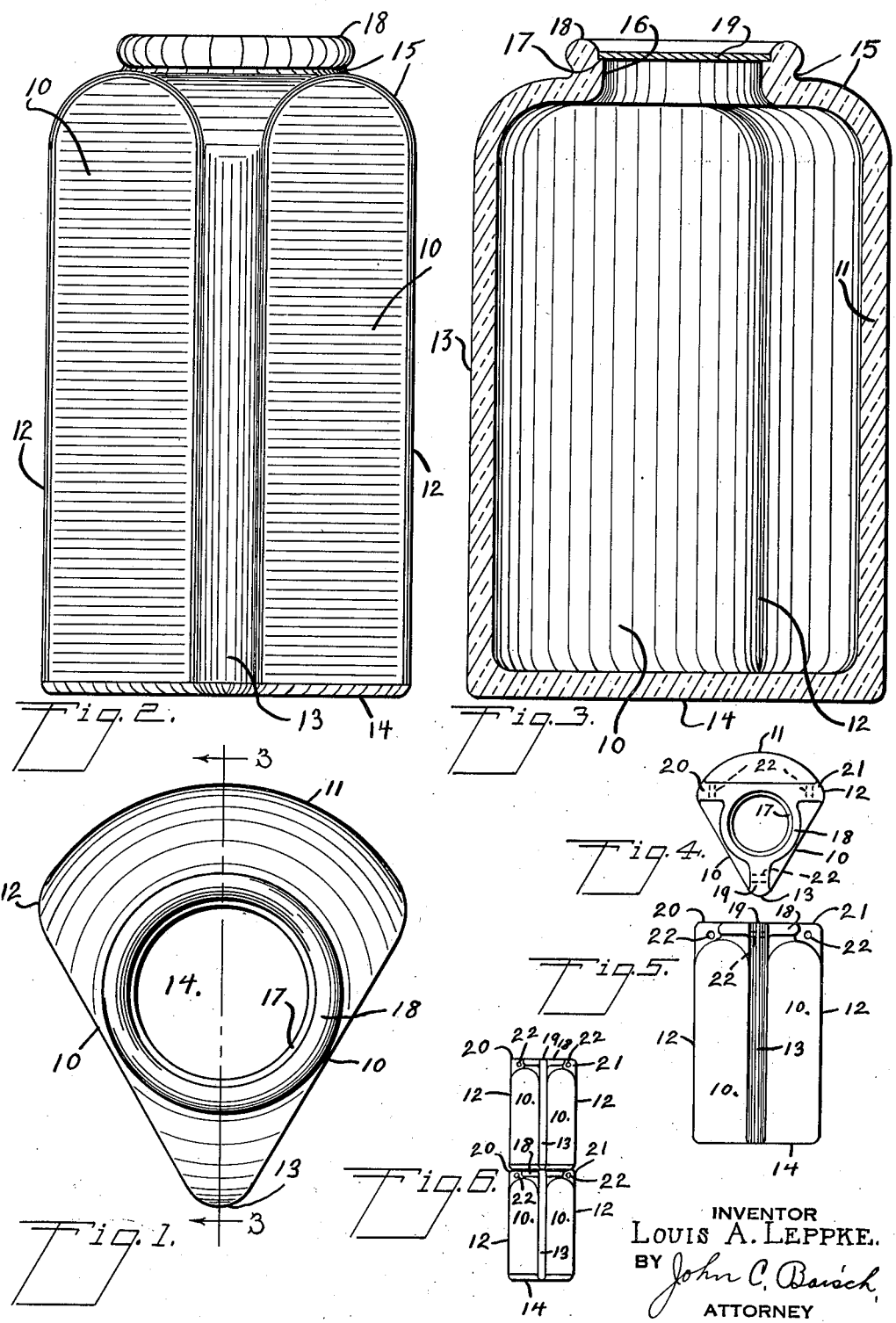
INVENTOR
LOUIS A. LEPPKE.
BY John C. Barsch
ATTORNEY Patented Feb. 23, 1937

2,071,847

UNITED STATES PATENT OFFICE 2,071,847

BOTTLE

Louis A. Leppke, Omaha, Nebr.

Application April 10, 1936, Serial No. 73,691

1 Claim. (Cl. 215—1)

This invention relates to bottles generally and particularly to short trianguloid milk bottles.

The object of this invention is to provide a compact milk bottle that may be packed or arranged in a minimum space.

Another object is to provide a bottle that may be stacked in superposed relation without danger of the upper bottle becoming easily overbalanced and falling.

Another object is to provide such a bottle from which the contents may be easily drunk.

Another object is to provide such a bottle that will fit the natural curve of the hand when the bottle is being handled.

Another object is to provide such a bottle that may be readily filled and capped with present filling and capping equipment.

A further object is to provide such a bottle to which a bail may be attached whereby said bottle may be carried easily, said bottles being of such shape that a plurality of them will nest together when thus carried by bails.

A still further object is to provide a bottle that is simple in construction and inexpensive to manufacture.

Numerous other objects and advantages of the invention will be apparent as it is better understood from the following detailed description taken in connection with the accompanying drawing wherein:

Figure 1 is a plan view of one embodiment of my bottle.

Figure 2 is an elevational view of same.

Figure 3 is a vertical section through said bottle taken on line 3—3 of Figure 1.

Figure 4 is a reduced plan view of another embodiment of the device.

Figure 5 is a reduced elevational view of same.

Figure 6 is a reduced elevational view of two of said bottles stacked in superposed relation.

Referring more particularly to the drawing, Figures 1, 2, and 3 illustrate one embodiment of the bottle. Said bottle comprises a body substantially trianguloid in shape as seen from an end or in lateral or horizontal cross-section. More specifically, the shape of the body in cross-section is that of a sector of a circle, having sides 10 which correspond to the radii of a circle and an arcual side 11 which corresponds to the arc of the circle subtended by said radii. The longitudinal corners 12 and the longitudinal corner 13 are rounded. Inasmuch as the bottle is preferably made of glass or similar material the body is seamless.

The lower end of the body is closed by a bottom or bottom end wall 14 formed integrally with the body. The upper end of the body tapers inwardly to provide a short neck 15 having an annular opening 16. The center of the opening 16 is positioned centrally of the corners 12 and 13 and side 11 so that when the bottle is placed in a bottling machine said opening 16 will be in operative position for filling and capping without changing the position of the filling mechanism and capping mechanism. A notch 17 is provided on the inside of the neck adjacent the rim 18 thereof to receive a cap 19 for sealing the bottle.

The modified embodiment of the bottle shown in Figures 4, 5, and 6 is provided with lugs 19, 20 and 21 formed integrally with the tapered portion or neck of the bottle and with the rim 18. The upper side of said lugs are in the same horizontal plane as the rim 18 and said lugs, together with the rim, form a base upon which bottles may be placed for stacking, as shown in Figure 6. Bottles thus stacked will not easily become unbalanced and fall.

The lugs 20 and 21 extend at right angles to lug 19 to permit removal of the molds after the bottles have been formed therein, the longitudinal break in such molds would be on the line 3—3 of Figure 1.

Each lug is provided with a laterally extending hole 22 through which a bail, not shown, may be inserted for carrying the bottles.

The particular advantage of providing lugs in such manner that the bottles may be stacked in superposed relation is in stacking same in milk wagons or trucks where space is at a premium and it is highly desirable to take as much milk as possible on a route.

The shape of the bottle is such that its arcual side will fit naturally in the hand, and when thus held the contents thereof may be easily drunk therefrom as the rim of the bottle closely approaches the plane of the sides 10. This bottle is very desirable in cafes and the like where small bottles of milk are served over the counter. The milk may be drunk from the bottle instead of providing an extra glass as is now done.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the forms hereinbefore described being the preferred embodiments thereof.

Having thus described my invention what I claim is:

A bottle comprising a body, said body being sector shaped in cross-section having two sides corresponding to the radii of a circle and another side which corresponds to the arc of a circle subtended by the radii, a bottom, a short neck on the upper end of said body terminating in an opening, the center of said opening being in a central position relative to the respective corners of the arcuate side of the body, the rim of said opening being adjacent the radial sides of the body, and lugs on the neck the top sides of which are in substantially the same plane as the outer end of the neck, said lugs being disposed chordally of the arcuate side of the bottle and radially between the neck of the bottle and the radial center of the radial sides, the chordally disposed lugs having openings therein adjacent their outer ends for a carrying bail.

LOUIS A. LEPPKE.